Patented Sept. 27, 1938

2,131,098

UNITED STATES PATENT OFFICE 2,131,098

COLORATION OF MATERIALS

Henry Dreyfus, London, England

No Drawing. Application September 20, 1935, Serial No. 41,419. In Great Britain September 28, 1934

10 Claims. (Cl. 8—46)

This invention relates to the coloration of materials made of or containing synthetic resins.

At the present time synthetic resins find extensive and increasing employment in numerous industries. Amongst the many industries in which these bodies are employed there may be mentioned the plastic industry and the textile industry.

During recent years textile materials impregnated with or containing synthetic resins have come into prominence. Such textiles are not so readily colored by the dyestuffs customarily employed for dyeing the materials in the absence of the synthetic resin. I have now found that such materials may be colored with unsulphonated coloring matters or with sulphonated coloring matters in which the sulpho group represents a relatively small part of the whole dyestuff molecule, e. g. as in many monosulphonic acids. Preferably, however, water insoluble unsulphonated colors are used which may conveniently be applied in the form of dispersions or colloidal solutions. I have further found that numerous unsulphonated compounds which can be converted into coloring matters on the materials have affinity for textile materials impregnated with or containing synthetic resins. Examples of such compounds are azo dye components and oxidizable amines.

Not only, however, can textile materials impregnated with or containing synthetic resins be colored by the above means, but also other materials made of or containing synthetic resins and having at least one dimension small in relation to another, for example films or filaments.

Various coloring matters may be employed for coloring textile materials impregnated with or containing synthetic resins or other synthetic resin materials in accordance with the present invention. Thus there may be employed unsulphonated or other relatively insoluble derivatives of the "azo" class, e. g. unsulphonated azo dyestuffs obtainable from amino naphthols or their nuclear substitution products and containing the azo group linked to the naphthalene nucleus in a position ortho or peri to an auxochromic group; unsulphonated azo dyestuffs obtainable from naphthylene diamines; unsulphonated azo dyestuffs containing an anthraquinone nucleus, e. g. 2-methyl-anthraquinone-1 - azo-dimethyl-meta-amino-phenol; insoluble or relatively insoluble pyrazolone derivatives, for example unsulphonated azo derivatives of pyrazolone compounds, such for example as those obtained by coupling 1-phenyl-3-methyl-5-pyrazolone, or 1.3-dimethyl-5-pyrazolone with diazotized amino compounds, e. g. diazo compounds from aniline, para-anisidine, para-aminobenzene-azo-dimethylaniline, para-dimethyl-amino-aniline or para-amino-phenol; unsulphonated azo derivatives of 2:4-dinitro-6-alkoxy or alkyl anilines obtainable by diazotizing the aniline derivative and coupling with coupling components of the naphthalene or other suitable series; unsulphonated coloring matters or compounds of the stilbene group, for example stilbene disazobisphenol, stilbene disazobis-m-toluidine, stilbene disazobis-α-naphthylamine, amino-stilbene-azo-meta-phenylenediamine, or aminostilbene-azo-metatoluidine; unreduced indophenols (aryl or substituted aryl benzo- or naphtho-quinone-mono-imides) or insoluble or relatively insoluble coloring matters of polyarylmethane, oxazine, azine, thiazine and thiazole series, or unreduced basic derivatives of the anthraquinone series, e. g. rosaniline base or its alkylated or arylated derivatives, pararosaniline base, malachite green base, safranine base, amino- and aminohydroxy-anthraquinones or their derivatives such as 1-paratolylamino-4-hydroxy-anthraquinone, 1-paratolylamino-4-methylamino-anthraquinone, and especially anthraquinone derivatives substituted in three alpha positions by a hydroxyl group, an arylamino group and an amino group respectively; or insoluble or relatively insoluble acidyl derivatives of amino anthraquinones or of substituted amino anthraquinones, containing one or more aliphatic acidylamino groups, e. g. acetyl-, propionyl-, oxalyl, or succinyl-amino groups with or without other substituent groups such as amino, hydroxy, chlor and the like, for example 1-acetyl-amino-anthraquinone or 1-acetylamino-4-oxy, -4-methoxy, -4-amino, -4-methylamino or -4:5:8-triamino anthraquinones and so forth; hetero-nuclear di-α-hydroxy anthraquinones substituted in one of the remaining α-positions by an arylamino group and in the other α-position by an amino or a non-aromatically substituted amino group, e. g. 4-amino-8-phenylamino-1:5-dihydroxy anthraquinone or 4-amino-5-p-tolylamino-1:8-dihydroxyanthraquinone; unreduced vat dyestuffs of the indigoid or anthraquinone series such for example as those sold under the registered trade-marks "Indanthrene", "Cibanone", "Algol" and "Helindone"; esterified leuco vat dyestuffs; insoluble or relatively insoluble nitro derivatives of diarylamines such for example as 2:4-dinitro-diphenylamine and 2:4-dinitro-4'-hydroxy-diphenyl-amine or their alkyl, alkoxy, hydroxy, halogen or amino derivatives; 4-nitro-diphenylamine or its alkyl, alkoxy or halogen derivatives; 2-nitro-diphenylamine and its halogen, alkyl and alkoxy-amino or acidyl-amino derivatives, e. g. 2-nitro-4-chlor-4'-methyl-diphenylamine, 2-nitro-4-chlor-4'-ethoxy-diphenylamine; nitro amino diaryl compounds, for example 3-nitro-4-amino-diphenyl, 3-nitro-4-amino-4'-acetylamino-diphenyl, or other nitro-amino-diaryl compounds and compounds obtainable by diazotizing these bodies and coupling with suitable coupling components; the nitrogenous bodies obtainable by introducing nitrogen into naphthazarine or nuclear substitution products thereof with the aid of ammonia; N-(nitro-aryl)-ar-tetrahydro-α—or β-naphthylamines; or there may be employed unsulphonated compounds obtainable by the introduction of one or more β-keto-acidyl groups into amino compounds of the azo, nitro-diarylamine, nitrodiaryl, nitro-diarylmethane or anthraquinone series, and unsulphonated products obtainable by the esterification of a phenolic hydroxyl group of an unsulphonated pyrazolone azo-dyestuff with an organic carboxylic residue, e. g. the product obtainable by acetylation of para-hydroxy benzene-azo-1-phenyl-3-methyl-5-pyrazolone.

The coloring matters may be applied in various ways. The invention particularly envisages their application, however, in the form of their aqueous dispersions or in more or less colloidal form as obtainable for instance with the aid of one or more suitable dispersing agents. For examples of dispersing agents suitable for use in the production of dispersions of dyestuffs for use in accordance with the present invention reference may be made to U. S. Patent Nos. 1,618,413, 1,618,414, 1,694,413, 1,690,481, 1,803,008, 1,840,572, 1,716,721, 1,928,647, 1,959,352, and U. S. application S. No. 493,224 filed 3rd November 1930.

If desired the dispersing agent may be used in conjunction with an organic solvent for the coloring matter, particularly a substantially water-insoluble organic solvent. Such solvents are hereinafter referred to as "auxiliary solvents". This process of using auxiliary solvents is of especial use in the dispersion of difficultly dispersible coloring matters or compounds.

Examples of auxiliary solvents which may be employed include the following:—

(a) Aliphatic hydrocarbons, e. g. hydrocarbons from petroleum;
(b) Aromatic and hydroaromatic hydrocarbons, e. g. benzene, toluene, xylene, cymene, cyclohexane, tetrahydro-naphthalene and decahydronaphthalene;
(c) Terpenes, e. g. turpentine or constituents thereof;
(d) Halogenated hydrocarbons, e. g. halogenated aliphatic hydrocarbons such as tetrachlorethane, trichlorethylene, and carbon tetrachloride, and halogenated aromatic hydrocarbons such as chlorbenzene;
(e) Alcohols or phenols, e. g. butyl alcohol, amyl alcohol, cyclohexanol, methyl cyclohexanols, phenol and cresols;
(f) Esters, e. g. butyl acetate and amyl acetate.

Mixtures of auxiliary solvents may be used if desired, for example commercial liquids such as fractions of petroleum etc. It will be appreciated, of course, that the auxiliary solvent should be chosen with due attention to the solubility characteristics of the particular synthetic resin to be treated, one being chosen that will not deleteriously affect the resin. At the same time, a suitable choice of auxiliary solvent may further lead to better penetration of the dyestuff into the material treated. Thus the penetration of dyestuffs, azo components and the like into synthetic resin materials may be facilitated by means of swelling agents for the synthetic resin, and some of the above auxiliary solvents may act as swelling agents for the resin and so aid penetration of the dyestuff into the material.

Again the dyestuff preparation employed in the coloration of synthetic resin materials may contain any other desired ingredients, e. g. swelling agents other than and in addition to any of the bodies listed above. As swelling agents there may be employed solutions or dispersions of substances having a solvent action on the resin. It will readily be appreciated that the swelling agents must be chosen with reference to the properties of the synthetic resin in the material. Thus phenol-aldehyde resins in the A stage of condensation are soluble in a large number of organic solvents by which they are merely swollen when in the B stage of condensation, whilst in the C stage they are unaffected by those solvents. Examples of swelling agents which may be employed in the treatment of phenol-aldehyde resins when in the B stage of condensation are alcohols, e. g. ethyl butyl or amyl alcohol, ketones, esters or other organic compounds, for example acetone, methyl ethyl ketone or ethyl or butyl acetate. For polyvinyl resins hot water may have a sufficient swelling effect. Phenols and phenolic compounds may also be employed as swelling agents for some synthetic resins, while, as has been indicated, many of the auxiliary solvents mentioned in connection with the production of dispersions may exercise a swelling action on resinous materials.

When dyeings or colorings are to be produced by the azoic or development process the insoluble or relatively insoluble component or components (whether base or developer or both) may be applied in either order or simultaneously to the materials and diazotization and development effected, or the diazo compound itself may be applied to the material before or after application of the coupling components and the color developed on the materials. The relatively insoluble components are conveniently applied in the form of dispersions prepared, for example with the aid of any of the dispersing agents and/or protective colloids and/or auxiliary solvents mentioned above. The invention further includes the production of black and other colorations on materials made of or containing synthetic resins by the oxidation of aromatic compounds, particularly aromatic amino compounds, e. g. aniline, thereon.

For printing or stencilling synthetic resin materials, an aqueous or other dispersion of one or more coloring matters or compounds may be thickened by the use of such substances as starches, flour, gums and the like and applied in the usual manner. Where the dyestuffs are soluble in water they may further be applied from aqueous solutions. Dyeing, printing or other treatments in accordance with the present invention may be followed by steaming, ageing or any other after-treatment that may be desirable.

While the invention is broadly applicable to the coloration of any materials made of or containing synthetic resins, such for example as films or filaments, e. g. filaments of a polymerized vinyl compound such as a polymerized vinyl acetate, it is, as has been indicated, of especial importance in connection with the coloration of textile materials coated or impregnated with synthetic resins, e. g. textile materials to which an anticrease finish has been imparted by impregnation with a synthetic resin. The textile base may be colored in the same shade as is the resin impregnant or in a different shade. Cross dyed effects may be obtained on knitted, woven, or other fabrics containing yarn impregnated with a synthetic resin, or synthetic resin yarn, and a cellulose yarn, e. g. cotton yarn, which is not impregnated with a synthetic resin, by dyeing the impregnated yarn or synthetic resin yarn with dispersed insoluble colors according to the present invention, and the cotton or other yarn with dyestuffs having affinity therefor but not for synthetic resins.

Examples of synthetic resins which may be colored in accordance with the present invention are the phenol-aldehyde resins, diphenylol-propane-formaldehyde resins, diphenylol-propane-furfural resins, and diphenylol cyclo paraffin-aldehyde resins, the condensation products of urea or thiourea with aldehydes with or without phenols, aromatic sulphonamide-aldehyde resins, the polyhydric alcohol-polybasic acid resins such for example as the glycerol-phthalic anhydride resins, synthetic resins obtainable from phenols, cresols, xylenols and other phenolic bodies by condensation with chlor-acetone, furfural, allyl alcohol and other allyl compounds, sulphur chlorides, acetaldehyde, croton aldehyde, beto-butanol and chloral, the resinous products obtainable from phenolic bodies including phenol itself, the cresols, the xylenols, resorcinol and pyrocatechin and acetone or other aliphatic ketones or cycloparaffin ketones, hydroxybenzophenone-aldehyde resins, e. g. 2:4- or 4:4'-dihydroxy benzophenone-formaldehyde resins and the methyl dihydroxy benzophenone-aldehyde resins, and the resins or other products obtainable by the polymerization of vinyl compounds, acrylic compounds, and other unsaturated compounds or the condensation products of vinyl compounds with aldehydes and the like. The invention finds its chief use where the synthetic resins are not in a state of complete insolubility and infusibility.

The invention is illustrated but not limited by the following examples, the proportions being expressed as parts by weight:—

Example 1

To dye a cotton fabric which has been impregnated with about 20% of its weight of synthetic resin by mercerizing with caustic soda solution, washing, impregnating while still wet with a solution made by boiling 50 parts of 40% formaldehyde with 50 parts of phenol and a little potassium carbonate for 5 minutes, squeezing to remove excess solution, and drying for 1-3 minutes at 170° C.

1 part of 1:4-di-(methylamino)-anthraquinone is pasted with 10 parts of xylene and heated to about 70° C. The mixture is then poured into 15 parts of Turkey red oil, heated with stirring, and the whole poured into 3000 parts of soft water at about 50° C. 75 parts of the resin-impregnated cotton fabric is dyed in this bath at 90-100° C. for about 1-1½ hours. The material is then rinsed and dried.

Example 2

To dye a viscose fabric to which an anti-crease finish has been imparted by impregnating with a mixture of 10 parts of 40% formaldehyde, 5 parts of urea, 2 parts of boric acid and 25 parts of water, followed by squeezing to remove liquor much in excess of the weight of the fabric and drying at about 130° for 20-30 minutes.

1 part of 2:4-dinitro-diphenylamine is pasted with 10 parts of xylene and made up into a dyebath with 15 parts of Turkey red oil and 3000 parts of water in the manner described in Example 1. The fabric is dyed in this dyebath for about 1-1½ hours at 80-90° C. It is then rinsed and dried and finished as desired.

Example 3

100 parts of cotton fabric impregnated with a phenol-formaldehyde resin as described in Example 1 is dyed for 1 hour in a dyebath consisting of 2 parts of 1-amino-4-hydroxy-anthaquinone dissolved in 3000 parts of carbon tetrachloride, the dyeing temperature being about 60-70° C. When dyeing is complete the material is centrifuged and dried.

What I claim and desire to secure by Letters Patent is:—

1. Process for the coloration of textile material or film comprising a synthetic resin, which comprises applying thereto an aqueous dispersion of a water-insoluble dye compound containing at the most one sulphonic group.

2. Process for the coloration of textile material or film comprising a synthetic resin, which comprises incorporating therein a water-insoluble dye component containing at the most one sulphonic group by treatment with an aqueous dispersion of the dye component, and thereafter converting said dye component into dyestuff on the material.

3. Process for the coloration of textile material or film comprising a synthetic resin, which comprises applying thereto an aqueous dispersion of a water-insoluble unsulphonated dyestuff.

4. Process for the coloration of textile material or film comprising a synthetic resin, which comprises incorporating therein a water-insoluble unsulphonated dye component by treatment with an aqueous dispersion of the dye component, and thereafter converting said dye component into dyestuff on the material.

5. Process for the coloration of textile material impregnated with a synthetic resin, which comprises applying thereto an aqueous dispersion of an unsulphonated water-insoluble dyestuff.

6. Process for the coloration of textile material impregnated with a synthetic resin, which comprises applying thereto an aqueous liquid having dispersed therein a substantially water-insoluble dye and a liquid having a softening action on the synthetic resin.

7. Process for the coloration of textile material impregnated with a synthetic resin, which comprises incorporating therein a water insoluble unsulphonated dye component by treatment with an aqueous dispersion thereof and thereafter converting the dye component into a dye.

8. Process for the coloration of textile material impregnated with a synthetic resin, which comprises incorporating therein a water-insoluble diazotizable amine by treatment with an aqueous dispersion of the diazotizable amine, and thereafter diazotizing the amine and coupling with an azo dye coupling component.

9. Process for the coloration of textile material impregnated with a phenol-formaldehyde resin, which comprises applying thereto an unsulphonated water-insoluble dyestuff by treatment with an aqueous dispersion thereof.

10. Process for the coloration of a textile material impregnated with a urea formaldehyde resin, which comprises applying thereto an unsulphonated water-insoluble dyestuff by treatment with an aqueous dispersion thereof.

HENRY DREYFUS.